United States Patent Office 2,742,759
Patented Apr. 24, 1956

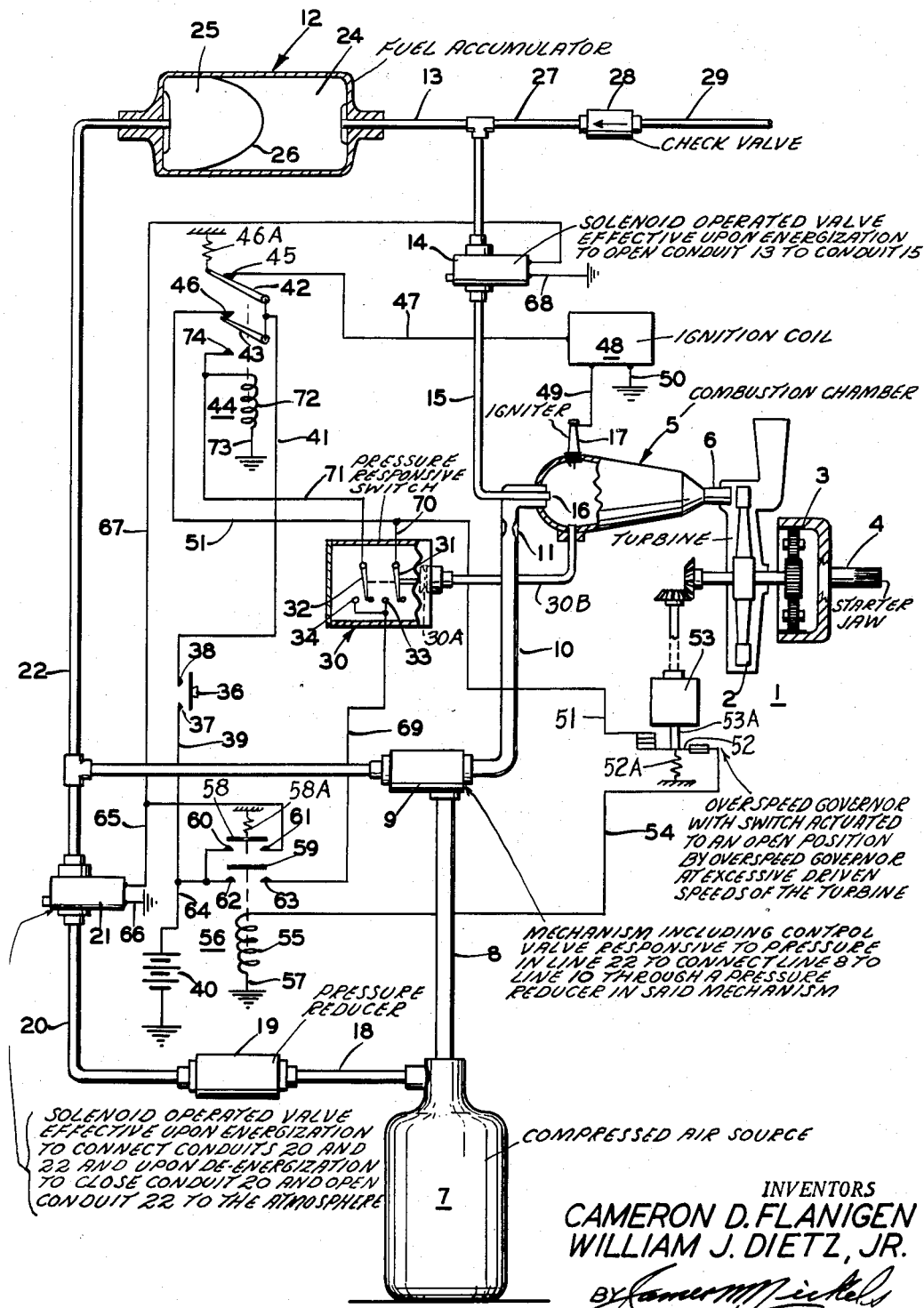

2,742,759
STARTER CONTROL SYSTEM

Cameron D. Flanigen, Hohokus, and William J. Dietz, Jr., Hillsdale, N. J., assignors to Bendix Aviation Corporation, Teterboro, N. J., a corporation of Delaware Application December 31, 1952, Serial No. 328,988

10 Claims. (Cl. 60—39.14)

The present invention relates to engine starters and more particularly to a liquid-fuel turbine type starter.

The advent of the gas turbine or jet engine introduces new problems in the design of starters. Such engines differ from the conventional piston type internal combustion engines in that they must be brought up to a self-sustaining speed in order to be started, whereas the piston type engine would start upon being cranked at a very low speed.

The severe cranking requirements of the gas turbine type of engine together with the compact design of the aircraft for which such engines are used render the conventional electric starters impractical due to the weight and bulk of the necessary batteries. A turbine type starter utilizing a small turbine running at a high speed appears to be adapted to the requirements inasmuch as it is small and does not require bulky batteries.

Chemical means and solid propellants such as a slow burning powder have been suggested for generating gases for the operation of the turbine. The aforenoted means, however, are objectional in view of the extensive safety precautions necessary to harness and control the generated gases. Further, the storage of the chemicals or powder create a hazardous condition.

It has been found that burning a mixture of fuel and air provides a means for generating gases which overcomes the aforenoted objections. The fuel used is the same as that normally used for the gas turbine or jet. In a system utilizing a mixture of fuel and air it is necessary to prevent the burning period from becoming extended with resultant damage to the turbine. Also it is desirable to conserve the compressed air in order that the size of the air tanks may be held to a minimum.

Heretofore, the combustion duration has been limited by various types of electronic timer which shuts off the flow of air and fuel after a predetermined period of time. This method has the disadvantage in that once the timer is started it is necessary that it run its complete cycle, whether ignition has taken place in the combustion chamber or not. Also the spark plug or igniter is energized for the full cycle. Further, they have the disadvantage of being highly sensitive to vibrations and shock.

In order to minimize radio interference in the high tension sparking circuits it is necessary to limit the time of energization of the circuit or else provide complex filters and shielding. In a closed combustion chamber once ignition has taken place it will be self-sustaining, hence, some means are desirable to shut off the high tension sparking circuit upon ignition.

In the present invention the rise in pressure in the combustion chamber occasioned by the burning of the fuel and air is utilized to de-energize the high tension sparking circuit. Further, upon a drop in pressure in the combustion chamber, the system is de-energized.

It is an object of the invention to provide an improved control system for a starter.

Another object of the invention is to provide an improved starter system for a gas turbine in which a predetermined amount of the fuel for the gas turbine is used to power the starting system.

Another object of the invention is to increase the spark plug life.

Another object of the invention is to provide novel means for controlling the ignition in a gas-air turbine type engine starter.

Another object of the invention is to eliminate the necessity of providing complex filter and shielding means to minimize radio interference. The above and other objects and features of the invention will appear more fully hereinafter from a consideration of the following description taken in connection with the accompanying drawing wherein one embodiment of the invention is illustrated by way of example.

In the drawing:

The single figure is a schematic diagram of a starter system embodying the invention.

Referring to the drawing, a starter is indicated generally by the numeral 1 and comprises a turbine 2 connected through reduction gearing 3 to starter jaw 4. The starter jaw 4 is adapted to be connected to the engine to be started (not shown) in a conventional manner. Details of the turbine 2, reduction gearing 3 and starter jaw 4 have been omitted as the structure thereof form no part of the present invention.

A combustion chamber 5 is connected to the turbine 2 by nozzles 6. A source of compressed air 7 is connected by conduit 8 to a mechanism 9 including a pressure responsive valve and reducer of conventional type and through the mechanism 9 to a conduit 10 and nozzle 11 to the chamber 5. A source of fuel, or accumulator 12, is connected by conduit 13, solenoid actuated valve 14, conduit 15 and fuel nozzle 16 to the chamber 5. A spark plug or igniter 17 is provided to ignite the mixture of fuel and air in the chamber 5.

The compressed air source 7 is also connected by conduit 18, pressure reducer 19, solenoid actuated valve 21 and conduit 22 to the fuel accumulator 12. Also the pressure responsive valve of the mechanism 9 is connected to the conduit 22 so that upon the air pressure in the conduit 22 exceeding a predetermined value, as upon the aforesaid valve 21 being actuated to an open position, the pressure responsive valve of the mechanism 9 is actuated to an open position. Such valve of the mechanism 9 is of conventional type and is actuated to the open position by the air pressure applied through conduit 22 so as to permit air to flow through the pressure reducer of the mechanism 9 from the line 8 and through conduit 10 to the nozzle 11 of the chamber 5.

The pressure reducer of the mechanism 9 is of conventional type so arranged as to supply air from conduit 8 at a reduced predetermined pressure through line 10 and nozzle 11 to the chamber 5.

The accumulator 12 has a fuel section 24 and an air section 25. The sections 24 and 25 are separated by a leak-proof elastic diaphragm 26. Air enters the air section 25 from the conduit 22. The fuel section 24 is connected to the aircraft fuel system (not shown) by conduits 13, 27, check valve 28 and conduit 29.

A pressure responsive switch 30 is provided of conventional type including a switch operating bellows 30A connected by a pressure conduit 30B so as to be actuated by the pressure within the combustion chamber 5. The switch 30 has switch members 31 and 32 which are normally biased in an open position by the spring tension of bellows 30A. The switch members 31 and 32 when actuated to a closed position by the combustion chamber pressure applied to the bellows 30A through conduit 30B are adapted to engage contacts 33 and 34 respectively.

A momentary starting switch 36 is adapted when actuated to a closed position to engage contacts 37 and 38. The contact 37 is connected by conductor 39 to a source of energy such for example as a battery 40, one side of which is grounded. The contact 38 is connected by a conductor 41 to switch members 42 and 43 of relay 44. The switch members 42 and 43 are normally biased into engagement with contacts 45 and 46 respectively by a spring 46A. The contact 45 is connected by a conductor 47 to the input of ignition coil 48. The output of the ignition coil 48 is connected by conductor 49 to the spark plug 17. The ignition coil 48 is connected to ground in the conventional manner by conductor 50.

The contact 46 is connected by conductor 51 to one side of a switch 52 biased by a spring 52A to a normally closed position. The switch 52 is operated by a centrifugal overspeed governor 53 of conventional type connected by gearing to the turbine 2. Upon the turbine 2 exceeding a predetermined speed, the switch 52 will be actuated by a rod 53A of the overspeed governor 53 to an open position. The other side of the switch 52 is connected by a conductor 54 to one end of control winding 55 of relay 56. The other end of the winding 55 is connected to ground by a ground connection 57.

The relay 56 has a pair of switch members 58 and 59 normally biased in an open position by a spring 58A. The switch member 58 is adapted to engage contacts 60 and 61, when actuated to a closed position, and switch member 59 is adapted to engage contacts 62 and 63 when in the closed position. The contacts 60 and 62 are connected by conductor 64 to the battery 40. The contact 61 is connected by conductor 65 to one terminal of the solenoid valve 21. The other terminal of the valve 21 is connected by conductor 66 to ground. Also the contact 61 is connected by conductor 67 to one terminal of the solenoid valve 14. The other terminal of the valve 14 is connected by a conductor 68 to ground. The contact 63 is connected by conductor 69 to the contacts 33 and 34 of the switch 30.

The switch member 31 of the switch 30 is connected by conductor 70 to the conductor 51. The switch member 32 of the switch 30 is connected by conductor 71 to one end of winding 72 of the relay 44. The other end of the winding 72 is connected by conductor 73 to ground. Also connected to the conductor 71 is a contact 74 of the relay 44.

In operation, actuating the switch member 36 to the closed position closes a circuit from the battery 40 through switch members 42 and 43 to energize the ignition coil 48 and the winding 55 of the relay 56 through normally closed switch 52. Energization of the winding 52 actuates the switch members 58 and 59 of the relay 56 into engagement with their associated contacts 60, 61 and 62, 63. This completes a circuit from the battery 40 to energize the solenoid valves 14 and 21 and actuates them to an open position. Energization of the valve 21 pressurizes the fuel accumulator and also actuates the pressure responsive valve of the mechanism 9 to permit air to flow to the combustion chamber 5 through the pressure reducer of the mechanism 9. The contacts 33 and 34 of the switch 30 are also energized.

Upon ignition taking place in the combustion chamber 5, the pressure therein builds up rapidly and through operation of the bellows 30A actuates the switch members 31 and 32 of the switch 30 into engagement with the respective contacts 33 and 34. This bypasses the switch member 36 and energizes the winding 55 through pressure switch 30 and centrifugal switch 52. Also actuation of the switch 30 energizes the winding 72 of the relay 44 causing it to actuate the switch arm 42 to an open position and the switch arm 43 into engagement with the contact 74. Actuation of the switch arm 42 interrupts the energization of the ignition circuit and halts sparking of the plug 17. The switch member 43 coacts with the contact 74 to render the starting switch 36 in the closed position ineffective throughout the starting cycle to reinitiate the starting cycle. In case the switch 36 is held in the closed position throughout the cycle, a new cycle cannot be initiated without first releasing the switch 36.

Upon the starting cycle being completed, due to either burning of the fuel in the accumulator or the switch 52 being opened by operation of the overspeed governor 53, the winding 55 will be de-energized thus permitting the relay 56 to return to an open position. This de-energizes the respective solenoids operating the valves 14 and 21 thus returning them to a closed position shutting off the air and fuel. The valve 21 is of a conventional type so arranged that, when closed, the valve 21 vents the conduit 22 to atmosphere and removes the pressure from the pressure responsive valve of the mechanism 9 and the air section 25 of the accumulator 12. Removal of the pressure in the conduit 22 permits the pressure from the air supply 7 to close the pressure responsive valve of the mechanism 9 and shut off the air from conduit 8 to conduit 10.

Also the winding 72 is de-energized and the switch members 42 and 43 return to their normal position.

Upon the air pressure being removed from the air section 25 of the accumulator 12, the fuel section 24 will be refilled with fuel from the craft's fuel system through the conduit 29 and check valve 28.

While the arrangement shown is applied to a control system of a combustion starter, it is equally applicable to any combustion apparatus wherein it may be desirable for any purpose to shut off the ignition spark when it is no longer required.

Although only one embodiment of the invention has been illustrated and described, various changes in the form and relative arrangement of the parts, which will now appear to those skilled in the art, may be made without departing from the scope of the invention.

What is claimed is:

1. For use with an engine starter of the turbine type powered by gases from combustion of a mixture of fuel and air in a combustion chamber, the combination comprising ignition means, means for energizing said ignition means to ignite said mixture of fuel and air, means responsive to a rise in a fluid pressure caused by fuel supplied said combustion chamber upon ignition of said mixture of fuel and air, and means controlled by said pressure responsive means to de-energize said ignition means upon said rise in pressure exceeding a predetermined value and terminate the starting cycle upon a decrease in said pressure due to depletion of starting fuel.

2. In a turbine type starter powered by burning a mixture of fuel and air in a combustion chamber, the combination comprising air control means, fuel control means, ignition means for said combustion chamber, control means for initially energiing said air control means, said fuel control means and said ignition means, auxiliary control means including a pressure switch responsive to the pressure in said combustion chamber to effect energization of said air and fuel control means independent of said initial control means and to effect de-energization of said ignition means upon said pressure exceeding a predetermined value and to de-energize said air and fuel control means upon said pressure falling below said predetermined value.

3. The combination as described in claim 2 in which said auxiliary control means includes means responsive to the speed of said starter to de-energize said fuel and air control means upon said speed exceeding a predetermined value.

4. A control system for an engine starter powered by burning a mixture of fuel and air under pressure in a combustion chamber, the system comprising a starting switch, relay means connected for energization upon actuation of said starting switch, a solenoid actuated air control valve, a solenoid actuated fuel control valve, ignition means for said combustion chamber, circuit means responsive to energization of said relay means to energize said air and fuel control valves, control means including switch means responsive to the pressure in said combustion chamber to effect energization of said solenoid actuated valves independent of said starting switch and to effect de-energization of said ignition means upon the pressure in said combustion chamber exceeding a predetermined value, and means energized by said switch means to render said starting switch ineffective.

5. The combination as set forth in claim 4 in which said control means includes means responsive to the speed of said starter, switch means in series with said relay means and operated by said speed responsive means to effect de-energization of said solenoid actuated valves upon the speed of said starter exceeding a predetermined value.

6. For use in an engine starter adapted to be powered by the burning of a mixture of air and fuel in a combustion chamber, a control system comprising air control means, fuel control means, ignition means for said combustion chamber, means for initially actuating said air and fuel control means to an open position and to energize said ignition means, and pressure responsive means to take over the control of said fuel and air control means and to de-energize said ignition means upon the pressure in said combustion chamber exceeding a predetermined value and to actuate said air and fuel control means to a closed position upon said pressure dropping below said predetermined value.

7. An engine starter system comprising a combustion chamber, a turbine, nozzle means connecting said combustion chamber to said turbine, a starter jaw member, reduction gearing interconnecting said turbine and said jaw member, a source of compressed air, means including an electrically operated valve for connecting said air source to said combustion chamber, a source of fuel, means including a second electrically operated valve for connecting said source of fuel to said combustion chamber, means to pressurize said fuel source by said air supply through said first valve, ignition means for said combustion chamber, a source of electrical energy, a main relay, means including a starting switch to initially energize said main relay and said ignition means, circuit means responsive to actuation of said main relay to energize said valves, means including a pressure responsive switch to effect energization of said main relay independent of said starting switch upon the pressure in said combustion chamber exceeding a predetermined value, and auxiliary relay means controlled by said pressure switch to disable the starting switch and to deenergize said ignition means upon the pressure in said combustion chamber exceeding a predetermined value.

8. The combination as described in claim 7 and including a speed responsive switch in series with said main relay, said speed responsive switch being adapted to deenergize said main relay upon the starter speed exceeding a predetermined value.

9. In an engine starter of the type powered by combustion gases generated in a combustion chamber upon ignition in said chamber of a combustible mixture of a fluid fuel and a combustion supporting fluid medium; the combination comprising ignition means, means for energizing said ignition means to ignite said combustible mixture, means responsive to pressure of the combustion gases upon the ignition of said mixture, means controlled by said pressure responsive means to deenergize said ignition means upon said combustion gas pressure exceeding a predetermined value and terminate the starting cycle upon a decrease in said pressure due to depletion of starting fuel.

10. In an engine starter of the type powered by combustion gases generated in a combustion chamber upon ignition in said chamber of a combustible mixture of a fluid fuel and a combustion supporting fluid medium; the combination comprising ignition means, means for energizing said ignition means to ignite said combustible mixture, first valve means for controlling the supply of the combustion supporting fluid medium to the combustion chamber, second valve means for controlling the supply of the fluid fuel to said chamber, means for actuating said first and second valve means to an open position to admit the fuel and combustion supporting medium to said combustion chamber for ignition by said ignition means, means responsive to the pressure of the combustion gas upon the ignition of said mixture, means controlled by said pressure responsive means to deenergize said ignition means upon the combustion gas pressure exceeding a predetermined value, and means controlled by said pressure responsive means to cause said first and second valve means to close upon a decrease in said pressure below said value so as to terminate the starting cycle.

References Cited in the file of this patent

UNITED STATES PATENTS

| 1,014,797 | Wurtz | Jan. 16, 1912 |
| 2,379,455 | Prince | July 3, 1945 |
| 2,643,511 | Briggs | June 30, 1953 |

OTHER REFERENCES

Bansbach: Abstract of application Serial No. 40,824, published Sept. 4, 1951, 650 O. G. 301.